US008430112B2

(12) United States Patent
Matheis et al.

(10) Patent No.: US 8,430,112 B2
(45) Date of Patent: Apr. 30, 2013

(54) SLURRY FEED SYSTEM AND METHOD

(75) Inventors: Timothy Frank Matheis, Palmetto, FL (US); James Paul Harshman, Bradenton, FL (US); Michael Sumner Murphy, Sarasota, FL (US)

(73) Assignee: Siemens Industry, Inc., Alpharetta, GA (US)

( * ) Notice: Subject to any disclaimer, the term of this patent is extended or adjusted under 35 U.S.C. 154(b) by 278 days.

(21) Appl. No.: 12/835,322

(22) Filed: Jul. 13, 2010

(65) Prior Publication Data
US 2012/0012188 A1 Jan. 19, 2012

(51) Int. Cl.
*B08B 3/00* (2006.01)
(52) U.S. Cl.
USPC ... 137/15.05; 137/239; 137/240; 137/565.11; 137/861; 210/141; 210/198.1; 210/209
(58) Field of Classification Search ............ 137/238, 137/239, 240, 565.11, 861, 15.04, 15.05; 210/97, 106, 134, 141, 198.1, 209, 258, 749, 210/916
See application file for complete search history.

(56) References Cited

U.S. PATENT DOCUMENTS

| 191,476 | A | 5/1877 | Seligman |
|---|---|---|---|
| 221,232 | A | 11/1879 | Hirsh |
| 653,741 | A | 7/1900 | Jewell |
| 1,543,939 | A | 6/1925 | Maclachlan |
| 1,701,825 | A | 2/1929 | Seil |
| 1,991,242 | A | 2/1935 | Cole et al. |
| 1,997,252 | A | 4/1935 | Fischer |
| 2,171,203 | A | 8/1939 | Urbain et al. |
| 2,310,655 | A | 2/1943 | Schneider |
| 2,673,143 | A | 3/1954 | Du Fresne et al. |
| 2,852,584 | A | 9/1958 | Komline |
| 3,080,253 | A | 3/1963 | Dietz et al. |
| 3,181,544 | A * | 5/1965 | Reid ............... 137/15.05 |
| 3,219,576 | A | 11/1965 | Makabe |
| 3,236,726 | A | 2/1966 | Ross |
| 3,259,571 | A | 7/1966 | Marshall et al. |
| 3,300,404 | A | 1/1967 | Howe et al. |
| 3,377,271 | A | 4/1968 | Cann |
| 3,401,113 | A | 9/1968 | Pruessner et al. |
| 3,502,566 | A | 3/1970 | Raymond et al. |
| 3,522,173 | A | 7/1970 | Lindman et al. |
| 3,607,736 | A | 9/1971 | Miyaji |
| 3,639,263 | A | 2/1972 | Troschinski et al. |

(Continued)

FOREIGN PATENT DOCUMENTS

| CA | 2169319 A1 | 8/1996 |
|---|---|---|
| CA | 2225223 A1 | 6/1999 |

(Continued)

OTHER PUBLICATIONS

Meyer et al., "Integrated Odor Control using Nitrate Enhanced by Alkaline Material and Anthraquinone," 83rd Annual Water Environment Federation Technical Exhibition and Conference, Oct. 2-8, 2010, pp. 4542-4561.

(Continued)

*Primary Examiner* — Stephen M Hepperle
*Assistant Examiner* — Jessica Cahill

(57) ABSTRACT

The invention can provide or facilitate systems and methods for feeding a slurry and, in particular, to systems and methods for treating wastewater streams with a slurry having periodic flushing of conduits.

7 Claims, 2 Drawing Sheets

U.S. PATENT DOCUMENTS

| | | | |
|---|---|---|---|
| 3,697,322 A | 10/1972 | Lee et al. | |
| 3,705,098 A | 12/1972 | Shepherd et al. | |
| 3,862,851 A | 1/1975 | Speirs et al. | |
| 3,867,284 A | 2/1975 | Kappe et al. | |
| 3,915,853 A | 10/1975 | Luck | |
| 3,930,998 A | 1/1976 | Knopp et al. | |
| 3,948,774 A | 4/1976 | Lindman | |
| 3,953,335 A | 4/1976 | Jackson | |
| 3,957,674 A | 5/1976 | Sano et al. | |
| 3,959,127 A | 5/1976 | Bartha et al. | |
| 3,959,130 A | 5/1976 | Kloster et al. | |
| 3,966,450 A | 6/1976 | O'Neill et al. | |
| 3,974,783 A | 8/1976 | Flynn | |
| 4,007,262 A | 2/1977 | Bowers | |
| 4,049,545 A | 9/1977 | Horvath | |
| 4,093,544 A | 6/1978 | Ross | |
| 4,098,690 A | 7/1978 | Semmons | |
| 4,108,771 A | 8/1978 | Weiss | |
| 4,108,777 A | 8/1978 | Kurita | |
| 4,110,117 A | 8/1978 | McLeod | |
| 4,115,258 A | 9/1978 | Smith et al. | |
| 4,118,319 A | 10/1978 | Miyanohara et al. | |
| 4,123,355 A | 10/1978 | Poradek et al. | |
| 4,125,466 A | 11/1978 | Miyanohara et al. | |
| 4,148,726 A | 4/1979 | Smith | |
| 4,153,547 A | 5/1979 | McLean | |
| 4,169,906 A | 10/1979 | Hallstrom et al. | |
| 4,224,154 A | 9/1980 | Steininger | |
| 4,229,300 A | 10/1980 | Benes et al. | |
| 4,297,216 A | 10/1981 | Ishida et al. | |
| 4,304,673 A | 12/1981 | Reynolds et al. | |
| 4,340,489 A | 7/1982 | Adams et al. | |
| 4,446,031 A | 5/1984 | List | |
| 4,456,635 A | 6/1984 | Albanese et al. | |
| 4,501,668 A | 2/1985 | Merk et al. | |
| 4,505,819 A | 3/1985 | Barnes et al. | |
| 4,537,686 A | 8/1985 | Borbely et al. | |
| 4,566,469 A | 1/1986 | Semp et al. | |
| 4,574,076 A | 3/1986 | Castrantas | |
| 4,612,124 A | 9/1986 | Escrig | |
| 4,615,873 A | 10/1986 | Devuyst et al. | |
| 4,615,918 A | 10/1986 | Reichert et al. | |
| 4,622,149 A | 11/1986 | Devuyst et al. | |
| 4,668,541 A | 5/1987 | Fagerlund | |
| 4,670,315 A | 6/1987 | Hillemeier et al. | |
| 4,675,114 A | 6/1987 | Zagyvai et al. | |
| 4,680,127 A | 7/1987 | Edmondson | |
| 4,681,687 A | 7/1987 | Mouche et al. | |
| 4,710,404 A | 12/1987 | Reichert et al. | |
| 4,725,405 A | 2/1988 | Cassin et al. | |
| 4,760,027 A | 7/1988 | Sublettet | |
| 4,781,842 A | 11/1988 | Nicholson | |
| 4,786,525 A | 11/1988 | Kayser et al. | |
| 4,802,996 A | 2/1989 | Mouche et al. | |
| 4,818,404 A | 4/1989 | McDowell | |
| 4,849,128 A | 7/1989 | Timmons et al. | |
| 4,911,843 A | 3/1990 | Hunniford et al. | |
| 4,913,826 A | 4/1990 | Mannig et al. | |
| 4,966,714 A | 10/1990 | Hirosawa et al. | |
| 5,008,020 A | 4/1991 | Surash et al. | |
| 5,045,213 A | 9/1991 | Bowers | |
| 5,076,928 A | 12/1991 | Ballnus | |
| 5,076,937 A | 12/1991 | Montgomery | |
| 5,114,587 A | 5/1992 | Hagerstedt | |
| 5,141,647 A | 8/1992 | Bhadra | |
| 5,180,429 A | 1/1993 | Khasanov | |
| 5,200,065 A * | 4/1993 | Sinclair et al. | 210/104 |
| 5,200,092 A | 4/1993 | Richards et al. | |
| 5,211,852 A | 5/1993 | Van de Walle et al. | |
| 5,223,031 A | 6/1993 | Sugi et al. | |
| 5,228,995 A | 7/1993 | Stover | |
| 5,242,708 A | 9/1993 | Fekete et al. | |
| 5,246,641 A | 9/1993 | Perkins et al. | |
| 5,298,174 A | 3/1994 | Momont et al. | |
| 5,336,431 A | 8/1994 | Richards et al. | |
| 5,340,469 A | 8/1994 | Montgomery | |
| 5,350,516 A | 9/1994 | Bhadra | |
| 5,350,522 A | 9/1994 | Fyson | |
| 5,352,444 A | 10/1994 | Cox et al. | |
| 5,385,842 A | 1/1995 | Weimer et al. | |
| 5,422,015 A | 6/1995 | Angell et al. | |
| 5,480,550 A | 1/1996 | Sublette | |
| 5,482,630 A | 1/1996 | Lee et al. | |
| 5,500,368 A | 3/1996 | Tatnall | |
| 5,514,357 A | 5/1996 | Richmond et al. | |
| 5,525,155 A | 6/1996 | Allen | |
| 5,603,832 A | 2/1997 | Hoyvik et al. | |
| 5,616,283 A | 4/1997 | Huege et al. | |
| 5,620,744 A | 4/1997 | Huege et al. | |
| 5,683,748 A | 11/1997 | Gunderson | |
| 5,705,072 A | 1/1998 | Haase | |
| 5,718,944 A | 2/1998 | Miller | |
| 5,807,587 A | 9/1998 | Cox et al. | |
| 5,820,256 A | 10/1998 | Morrison | |
| 5,833,864 A | 11/1998 | Miller et al. | |
| 5,834,075 A | 11/1998 | Miller | |
| 5,905,037 A | 5/1999 | Cooney, Jr. et al. | |
| 5,948,269 A | 9/1999 | Stone | |
| 5,951,946 A | 9/1999 | Eaton et al. | |
| 5,958,334 A | 9/1999 | Haddon | |
| 5,984,993 A | 11/1999 | Mainz et al. | |
| RE36,651 E | 4/2000 | Hunniford et al. | |
| 6,045,695 A | 4/2000 | Janssen et al. | |
| 6,056,997 A | 5/2000 | Miller | |
| 6,059,973 A | 5/2000 | Hudson et al. | |
| 6,136,193 A | 10/2000 | Haase | |
| 6,143,184 A | 11/2000 | Martin et al. | |
| 6,146,522 A | 11/2000 | Fernholz et al. | |
| 6,221,652 B1 | 4/2001 | Janssen et al. | |
| RE37,181 E | 5/2001 | Hunniford et al. | |
| 6,309,597 B1 | 10/2001 | Ballinger, Jr. et al. | |
| 6,355,157 B1 | 3/2002 | Martin | |
| 6,409,926 B1 | 6/2002 | Martin | |
| 6,410,305 B1 | 6/2002 | Miller et al. | |
| 6,419,817 B1 | 7/2002 | Martin | |
| 6,576,144 B1 | 6/2003 | Vineyard | |
| 6,581,625 B1 * | 6/2003 | Arai et al. | 137/240 |
| 6,620,315 B2 | 9/2003 | Martin | |
| 6,623,647 B2 | 9/2003 | Martin | |
| 6,660,163 B2 | 12/2003 | Miklos | |
| 6,666,975 B1 | 12/2003 | Chen et al. | |
| 6,692,642 B2 * | 2/2004 | Josse et al. | 210/605 |
| 6,716,359 B1 | 4/2004 | Dennis, II | |
| 6,773,604 B2 | 8/2004 | Walton et al. | |
| 6,849,190 B2 | 2/2005 | Abu-Orf | |
| 6,893,862 B1 | 5/2005 | Horn et al. | |
| 6,964,737 B2 | 11/2005 | Abu-Orf et al. | |
| 7,037,433 B2 | 5/2006 | Abu-Orf et al. | |
| 7,087,172 B2 | 8/2006 | Hunniford | |
| 7,138,049 B2 | 11/2006 | Hunniford et al. | |
| 7,160,712 B2 | 1/2007 | Christiansen | |
| 7,186,341 B2 | 3/2007 | Hunniford et al. | |
| 7,241,382 B2 | 7/2007 | Gordon | |
| 7,285,207 B2 | 10/2007 | Hunniford et al. | |
| 7,285,217 B2 | 10/2007 | Simpson et al. | |
| 7,326,340 B2 | 2/2008 | Harshman et al. | |
| 7,390,399 B2 | 6/2008 | Dennis, II et al. | |
| 7,481,918 B2 | 1/2009 | Morrison et al. | |
| 7,553,420 B2 | 6/2009 | Simpson et al. | |
| 7,799,215 B2 | 9/2010 | Matheis et al. | |
| 7,799,224 B2 | 9/2010 | Matheis et al. | |
| 8,104,496 B1 * | 1/2012 | Washington et al. | 137/15.04 |
| 2002/0102229 A1 | 8/2002 | Wegner | |
| 2003/0201225 A1 | 10/2003 | Josse et al. | |
| 2004/0226891 A1 | 11/2004 | Dentel | |
| 2005/0077251 A1 | 4/2005 | Rieth et al. | |
| 2005/0142096 A1 | 6/2005 | Wegner | |
| 2006/0006121 A1 | 1/2006 | Simpson et al. | |
| 2006/0169646 A1 | 8/2006 | Andree et al. | |
| 2006/0174944 A1 * | 8/2006 | Olander et al. | 137/240 |
| 2007/0074758 A1 | 4/2007 | McQuade et al. | |
| 2007/0196319 A1 | 8/2007 | Alfrey et al. | |
| 2008/0017249 A1 * | 1/2008 | Hsu et al. | 137/240 |
| 2008/0237148 A1 | 10/2008 | Dennis, II et al. | |
| 2009/0095685 A1 | 4/2009 | Morrison | |
| 2009/0166276 A1 * | 7/2009 | Abe et al. | 210/138 |
| 2009/0188859 A1 | 7/2009 | Matheis | |

| | | | |
|---|---|---|---|
| 2009/0250389 | A1 | 10/2009 | Simpson et al. |
| 2010/0012558 | A1 | 1/2010 | Matheis |
| 2011/0146807 | A1* | 6/2011 | Bassmann et al. ......... 137/15.05 |

FOREIGN PATENT DOCUMENTS

| | | | |
|---|---|---|---|
| DE | 3414556 A1 | 10/1985 | |
| GB | 424919 A | 3/1935 | |
| GB | 2123516 A | 2/1984 | |
| JP | 57187099 A | 11/1982 | |
| JP | 10328676 A | 12/1998 | |
| JP | 11156374 A | 6/1999 | |
| MX | 9600562 A | 3/1997 | |
| WO | 0198558 A2 | 12/2001 | |
| WO | WO 2009149990 A1 * | 12/2009 | |

OTHER PUBLICATIONS

Harshman, "Case Study: Integrated Odor Control using Nitrate Enhanced by Alkaline Material and Anthraquinone," 83rd Annual Water Environment Federation Technical Exhibition and Conference, Oct. 2-8, 2010, 28 pages.
Hale, Bert et al., Use of Vitamin C and Sodium Erythorbate for Chlorite Reduction—Field Trial Results, AWA A1-MS Section Annual Conference, Beau Rivage Resort and Casino, Biloxi, MS, Oct. 5-7, 2003, pp. 1-10.
Helmer, R. et al., editors, "Water Pollution Control—A Guide to the Use of Water Quality Management Principles," E & FN Spon. (1997).
Higgins, M.J. et al., "Controlling Hydrogen Sulfide in Wastewater Using Base Addition," Proceedings of WEFTEC® '97, Water Environment Federation, 70th Annual Conference & Exposition, Chicago, IL, vol. 2, Part 1, "Residuals and Biosolids Management"—Part II—Collection Systems, (1997) pp. 587-594.
Heukelekian, H., "Effect of the Addition of Sodium Nitride to Sewage on Hydrogen Sulfide Production and B.O.D. Reduction", Sewage Works Journal 15(2):255-261 (1943).
Heukelekian, H., "Some Bacteriological Aspects of Hydrogen Sulfide Production from Sewage", Sew. Works Jour. 20, 490 (1948).
James, "Control Sewer Crown Corrosion Using the Crown Spray Process," U-Tech Underground Technology, Underground Construction, Sep. 2004, pp. 60-65, www.undergroundconstructiononline.com.
Lang, M., "Chemical Control of Water Quality in a Tidal Basin", Journal WPCF, 1414-1416 (1966).
Lawrance, W.A., "The Addition of Sodium Nitrate to the Androscoggin River", Sew. and Ind. Wastes, 22, 820 (1950).
Lee et al., "Metals Meet Their Match," Water Environment & Technology, Sep. 1993, pp. 69-73.
Lorgan, G.P., et al., "Nitrate Addition for the Control of Odor Emissions from Organically Overloaded, Super Rate Trickling Filters", 33rd Ann. Purdue Ind. Waste Conf., West Lafayette, Ind., (1978).
Marshall et al., "Preparing Collection Systems for Water Conservation," Water Environment & Technology, Aug. 1993, pp. 52-57.
McKinney, R.E., "The Role of Chemically Combined Oxygen in Biological Systems", Jour. San. Eng. Div., proc. Amer. Soc. Civil Engr., 82 SA4, 1053 (1956).
Metcalfe and Eddy, Wastewater Engineering, Treatment, Disposal, and Reuse, 3rd edition, 1991, pp. 108-110; 769-770.
"Methods for Chemical Analysis of Water and Wastes", U.S. Environmental Protection Agency, (1974) pp. 1-150.
"Methods for Chemical Analysis of Water and Wastes", U.S. Environmental Protection Agency, (1974), pp. 151-315.
Microbial Energy Generation/Oxidation of Inorganic Substrates, pp. 158-159.
'Mother Knows Best! The fascinating healing benefits of DHEA the body's "mother hormone!"' Bio/Tech News, 1995, pp. 1-8.
Moss et al., "Full-scale use of physical/chemical treatment of domestic wastewater at Rocky River, Ohio", Journal Water Pollution Control Federation, 49(11): 2,249-2,254; Nov. 1977.
Cox et al.,"Odor Control and Olfaction," Pollution Sciences Publishing Company, pp. 85, 454, 457, undated.
Newell, C. J., "Modeling Intrinsic Remediation With Multiple Electron Acceptors: Results From Seven Sites", Petroleum Hydrocarbons and Organic Chemicals in Ground Water Conference, Houston Texas, Nov. 29, 1995.

Olenik, "Domestic Sewage and Refuse Odor Control,"Industrial Odor Technology Assessment, 1956, Ann Arbor Science Publishers Inc., pp. 117-146.
Ondrus, Martin G. et al., The Oxidation of Hexaaquoiron (II) by Chlorine (III) in Aqueous Solution, Inorganic Chemistry, vol. 11, No. 5, 1972, pp. 985-989.
Painter, H.A., "A Review of Literature on Inorganic Nitrogen Metabolism in Microorganisms", Water Research, The Journal of the International Assocation on Water Pollution Research, vol. 4, No. 6, (1970).
Poduska, R.A., "Operation, control, and Dynamic Modeling of the Tennessee Eastman Company Industrial Wastewater Treatment System", 34th Ann. Purdue Indust. Waste Conf., Lafayette, Md. (1979).
Poduska, R.A., et al., "Successful storage lagoon odor control", Journal Water Pollution Control Federation, 53 (3):299,310; Mar. 1981.
Prakasam, T.B.S., et al., "Microbial Dentrification of a Wastewater Containing high Concentrations of Oxidized Nitrogen", Proceedings of the 31st Industrial Wste Conference, May 4-6, 1976, Purdue University.
Price, E.C., et al., "Sewage Treatment Plants Combat Odor Pollution Problems", Water and Sew. Works, 125, 10, 64 (1978).
USFilter Corporation, Strantrol MG/L 5 Controller, Data Sheet, 2004.
USFilter Wallace & Tiernan Worldwide Multi Function Analysers Depolox 4, Technical Information, 1999.
"Water Supply and Sewerage", Ernest W. Steel, Chapter 27, pp. 600-601 (4th Ed. 1960).
"Odor & Corrosion Control Microbiology—Metabolic Pathways of Odor & Corrosion Potential", In-Pipe Technology, publication date unknown (6 pages).
"Standard Methods for the Examination of Water and Wastewater", 14th Ed., Amer. Pub. Health Assn., Wash. D.C., 499-509 (1976).
Pomeroy et al., "Process Design Manual for Sulfide Control in Sanitary Sewerage Systems," U.S. Environmental Protection Agency, Oct. 1974, 136 pages.
Pomeroy et al., "Sulfide Occurrence and Control in Sewage Collection Systems," Grant No. 11010 ENX, U.S. Environmental Protection Agency, Washington, D.C., 173 pages.
Pomeroy, "Calcareous Pipe for Sewers," Journal Water Pollution Control Federation, vol. 41, No. 8, Aug. 1969, p. 1491.
Pomeroy, "Controlling Sewage Plant Odors," Consulting Engineer, Feb. 1963, pp. 101-104.
Pomeroy, "Generation and Control of Sulfide in Filled Pipes," Sewage and Industrial Wastes, vol. 31, No. 9, 1959, p. 1082.
Pomeroy, "Progress Report on Sulfide Control Research," Sewage Works Journal, vol. 18, No. 4, Jul. 1946, p. 597.
Press Release, "ACM Products to Save Los Angeles Millions of Dollars in Sewer Pipe Replacement Costs," Aug. 2001, 1 page.
Product Report/Surfactants for household detergents—petrochemial raw materials and uses, pp. 40-41, C&EN, Jan. 24, 1994.
Reid, et al., "Sewer Odor Studies," Sewage and Industrial Wastes, vol. 28, No. 8, Aug. 1956, pp. 991-997.
Renholds, "In Situ Treatment of Contaminated Sediments," Dec. 1998, U.S. Environmental Protection Agency Office of Solid Waste and Emergency Response, Technology Innovation Office, Washington, D.C.
Rodriguez-Gomez, et al., "Inhibition of Sulfide Generation in a Reclaimed Wastewater Pipe by Nitrate Dosage and Dentrification Kinetics," Water Environment Research, vol. 77, No. 2, pp. 193-198 (Mar./Apr. 2005).
Ryan, W.A., "Experiene with Sodium Nitrate Treatment of Cannery Wastes," Sew. Works Joru., 17, 1227 (1945).
Sanborn, N.H., "Nitrate Treatment of Cannery Waste," The Fruit Products Journal and American Vinegar Industry (1941).
Santry, Jr., "Hydrogen Sulfide in Sewers," Journal WCP, vol. 35, No. 12, Dec. 1963, pp. 1580-1586.
Sewer Corrosion Control and Rehabilitation, County Sanitation Districts of Los Angeles County, 5 pages, (undated).
Simpson, The Reduction of the Chlorite Ion, Fourth International Symposium on Chlorine Dioxide, Feb. 15 & 16, 2001, Caesars' Palace, Las Vegas, Nevada., pp. 1-10.

Stahl, J., "Notice Inviting Bids for Liquid Magnesium Hydroxide," to the Purchasing Agent of County Sanitation District No. 2 of Los Angeles County, State of California, Aug. 2002, 6 pages.

Sydney et al., "Control concrete sewer corrosion via the crown spray process," Water Environment Research, vol. 68, No. 3, May/Jun. 1996, pp. 338-342.

Tarquin, A. et al., Reduction of Chlorite Concentrations in Potable Water and Ferrous Chloride, Disinfection Practice, Water/Engineering & Management, Feb. 1995, pp. 35-37.

Thistlethwayte, "The Control of Sulphides in Sewerage Systems," Chapter 13—Corrective Measures for Existing Systems, pp. 153-164, (1972).

Water Supply and Sewerage, Ernest W. Steel, Chapter 27, pp. 600-601 (4th Ed. 1960).

Willenbring et al., "Calcium Nitrate" (incomplete title), Oct. 1988 or earlier.

Santry, "Odor Control," Journal Water Pollution Control Federation, Mar. 1966, pp. 460-462.

OxyChem Technical Data Sheet, "Hydrogen Sulfide Control in Wastewater Collection Systems," TDS 642-02, 2 pages, Jan. 2009.

Altivia Corporation, Letter dated Mar. 4, 2005 from Altivia Corporation to Yogesh Mehta, City of Houston, Public Works and Engineering.

Baida et al., Caustic Spray for Sewer Crown Corrosion Control, 11 pages.

Barber et al., "Chemical Control of Hydrogen Sulfide From Anaerobic Swine Manure," Canadian Agricultural Engineering, pp. 90-96, vol. 17, No. 2, Dec. 1975.

Basic Research on Sulfide Occurrence and Control in Sewage Collection Systems, Los Angeles County Sanitation District, NTIS, U.S. Dept. of Commerce, Feb. 28, 1969.

Beardsley et al., "Removal of Sewer Odors by Scrubbing with Alkaline Solutions," Sewage and Industrial Wastes, vol. 30, Jan.-Dec. 1958, pp. 220-225.

"Biochemical Oxidation of Polluted Lake Sediment with Nitrate—A new Lake Restoration Method", 1976.

Bryan, "Experiences with Odor Control at Houston, Texas," Sewage and Industrial Wastes, vol. 28, No. 12, Dec. 1956, pp. 1512-1514.

Bowker et al., "Odor and Corrosion Control in Sanitary Sewerage Systems and Treatment Plants," Copyright 1989, ISBN 0-8155-1192-2, pp. 59 and 60.

Bowker et al., "Odor and Corrosion Control in Sanitary Sewerage Systems and Treatment Plants," EPA Design Manual, United States Environmental Protection Agency, EPA/625/1-85/018, Oct. 1985 pp. 1-132.

Carpenter, W.T. "Sodium Nitrate Used to Control Nuisance", Water Works and Sew., 79, 175 (1932).

Caffey et al., "Magnesium Hydroxide Feed Reduces Odor and Provides pH Stabilization at a North Texas Municipal Wastewater Plant," Texas Water 2007 Conference Proceedings, Wastewater Odor Control, pp. 1-12.

Dague, R.R, "Fundamentals of Odor Control", Journal Water Pollution Control Federation, 44(4): 583-594; Apr. 1972.

Davis Process Division of Davis Water & Waste Industries, Inc.; Process Division Technical Bulletin No. B-401, Bioxide . . . the natural solution, A Proprietary Product, Designed to Promote Naturally Occurring Process Within Wastewater Collection and Treatment Systems Which Eliminate Order Producing Compounds.

"Detection, Control, and Correction of Hydrogen Sulfide Corrosion in Existing Wastewater Systems," United States Environmental Protection Agency, Office of Water (WH-547) EPA 8320R-92-001 Sep. 1992.

Directo et al., "Pilot plant study of physical-chemical treatment", Journal Water Pollution Control Federation, 649 (1)):2,081-2,098; Oct. 1977.

Dixon, K. L. et al., The Effect of Sulfur-Based Reducing Agents and GAC Filtration on Chlorine Dioxide By-products, Research and Technology, Journal AWWA, May 1991, pp. 48-55.

Jenneman et al., "Effect of Nitrate on Biogenic Sulfide Production,"Applied and Environmental Microbiology, Jun. 1986, vol. 51, No. 6, pp. 1205-1211 (7 pages).

Excerpts from ASCE Manuals and Reports on Engineering Practice—No. 69 titled "Sulfide in Wastewater Collection and Treatment Systems" (undated).

Eliassen, R., et al., "The Effect of Chlorinated Hydrocarbons on Hydrogen Sulfide Production", Sew. Works Jour., 21, 457 (1949).

Fales, A.L., "Treatment of Industrial Wastes from Paper Mills and Tannery on Neponset River", Jour. Ind. Eng. Chem., 21, 216 (1929).

Geraghty & Miller, Inc., "Five Year Review of Remedial Actions at the Van Waters & Rogers Inc., Project No. AZ0474.011," Prepared for Univar Corporation by Geraghty & Miller, Inc., Nov. 8, 1995.

Griese, Mark H. et al., Using Reducing Agents to Eliminate Chlorine Dioxide and Chlorite Ion Residuals in Drinking Water, Research and Technology, Journal AWWA, May 1991, pp. 56-61.

Gordon, Gilbert et al., Minimizing Chlorite Ion and Chlorate Ion I Water Treated with Chlorine Dioxide, Research and Technology, Journal AWWA, Apr. 1990, pp. 160-165.

* cited by examiner

SLURRY FEED SYSTEM AND METHOD

BACKGROUND OF INVENTION

Field of Invention

This invention relates to systems and methods for feeding a slurry and, in particular, to systems and methods for treating wastewater streams with a slurry having periodic flushing of conduits.

SUMMARY OF THE INVENTION

One or more aspects of the invention can be directed to a method of controlling odor in a wastewater stream comprising introducing a treating slurry for a predetermined treating period through a conduit to the wastewater stream. The method can comprise introducing a flushing fluid to the conduit for a predetermined forward flushing period, and introducing the flushing fluid to the conduit for a predetermined reverse flushing period. In certain embodiments, the predetermined forward flushing period is in a range of from about 60 seconds to about 180 seconds and the predetermined reverse flushing period is in a range of from about 20 seconds to about 120 seconds. Additionally, the predetermined treating period can be in the range of from about 30 minutes to about 120 minutes. The method can further comprise measuring one or more parameters of at least one of the wastewater stream, the treating slurry, and the source of the treating slurry. The measured parameter can be any one or more selected from the group consisting of flowrate, pH, pressure, temperature, volume of the treating slurry, pump speed, and viscosity. The method can further comprise adjusting a flowrate of the treating slurry based at least in part on the measured parameter. Even further, the method can comprise measuring a wastewater stream parameter and a treating slurry parameter, identifying a control profile based at least in part on the wastewater stream parameter and the treating slurry parameter and regulating addition of the treating slurry into the wastewater stream based at least in part on the control profile. In still further embodiments, the method can comprise generating an alarm condition when a magnitude of a difference between at least one expected value and at least one measured parameter of the system exceeds a predetermined tolerance value.

In accordance with one or more embodiments, the invention can provide a system for treating wastewater comprising a source of a treating slurry and a pump disposed to deliver at least a portion of the treating slurry to the wastewater. The system further comprises a source of a flushing fluid, and a controller configured to energize the pump in a treating mode that delivers the at least a portion of the treating slurry to the wastewater, and further configured to energize the pump in a first flushing mode that introduces the flushing fluid to a conduit that connects the source of the treating slurry to the wastewater, and to energize the pump in a second flushing mode that introduces the flushing fluid to the conduit. The controller can be further configured to actuate a first valve, located downstream from the source of the treating slurry and upstream of the pump, in an open position; a second valve, located downstream of the pump, in an open position; and a third valve, located downstream from the source of the flushing fluid, in a closed position, when in the treating mode. The controller of the system can be configured to actuate the first valve and the third valve in an open position, and to actuate the second valve in a closed position, when in the first flushing mode. The controller of the system can also be configured to actuate the first valve in a closed position, and to actuate the second valve and the third valve in an open position, when in the second flushing mode. The controller can be further configured to adjust a flowrate of at least one of the treating slurry from the source of the treating slurry and the flushing fluid from the source of the flushing fluid. The source of the treating slurry can comprise a mixer disposed to agitate the treating slurry. The treating slurry can comprise an alkaline earth hydroxide. The flushing fluid can be selected from the group consisting of water and an acidic solution. The viscosity of the treating slurry can be less than about 1000 centipoise.

In accordance with one or more embodiments, the invention can provide a computer readable medium including computer readable signals stored thereon defining instructions that, as a result of being executed by a controller, instruct the controller to perform a method of wastewater odor control comprising generating at least one first control signal in a treating mode, generating at least one second control signal in a flushing mode, identifying a first triggering condition that initiates generation of the at least one second control signal, and identifying a second triggering condition that re-initiates generation of the at least one first control signal. Identifying the first triggering condition can comprise monitoring a duration of an elapsed treating time during which the first control signal is generated, and comparing the duration of the elapsed treating time to a target treating period. Identifying the second triggering condition comprises monitoring a duration of an elapsed flushing time during which the second control signal is generated, and comparing the duration of the elapsed flushing time to a target flushing period. Identifying the first triggering condition comprises measuring a flowrate of a treating slurry introduced into the wastewater, and comparing the measured flowrate to an expected flowrate of the treating slurry to be introduced into the wastewater. Non-limiting examples of the computer readable medium can include compact discs, flash memory devices, hard discs, and floppy discs.

In accordance with one or more embodiments, a method of facilitating odor control of a wastewater stream is provided that comprises providing a controller configured to actuate a pump that is disposed to deliver a treating slurry to the wastewater stream through a conduit. The method can further comprise storing a predetermined treating period in the controller. The treating slurry can comprise at least one of calcium hydroxide and magnesium hydroxide.

BRIEF DESCRIPTION OF THE DRAWINGS

The accompanying drawings are not intended to be drawn to scale. In the drawings, each identical or nearly identical component that is illustrated in the various figures is represented by a like numeral. For purposes of clarity, not every component may be labeled in every drawing.

In the drawings.

DETAILED DESCRIPTION

Figure 1:
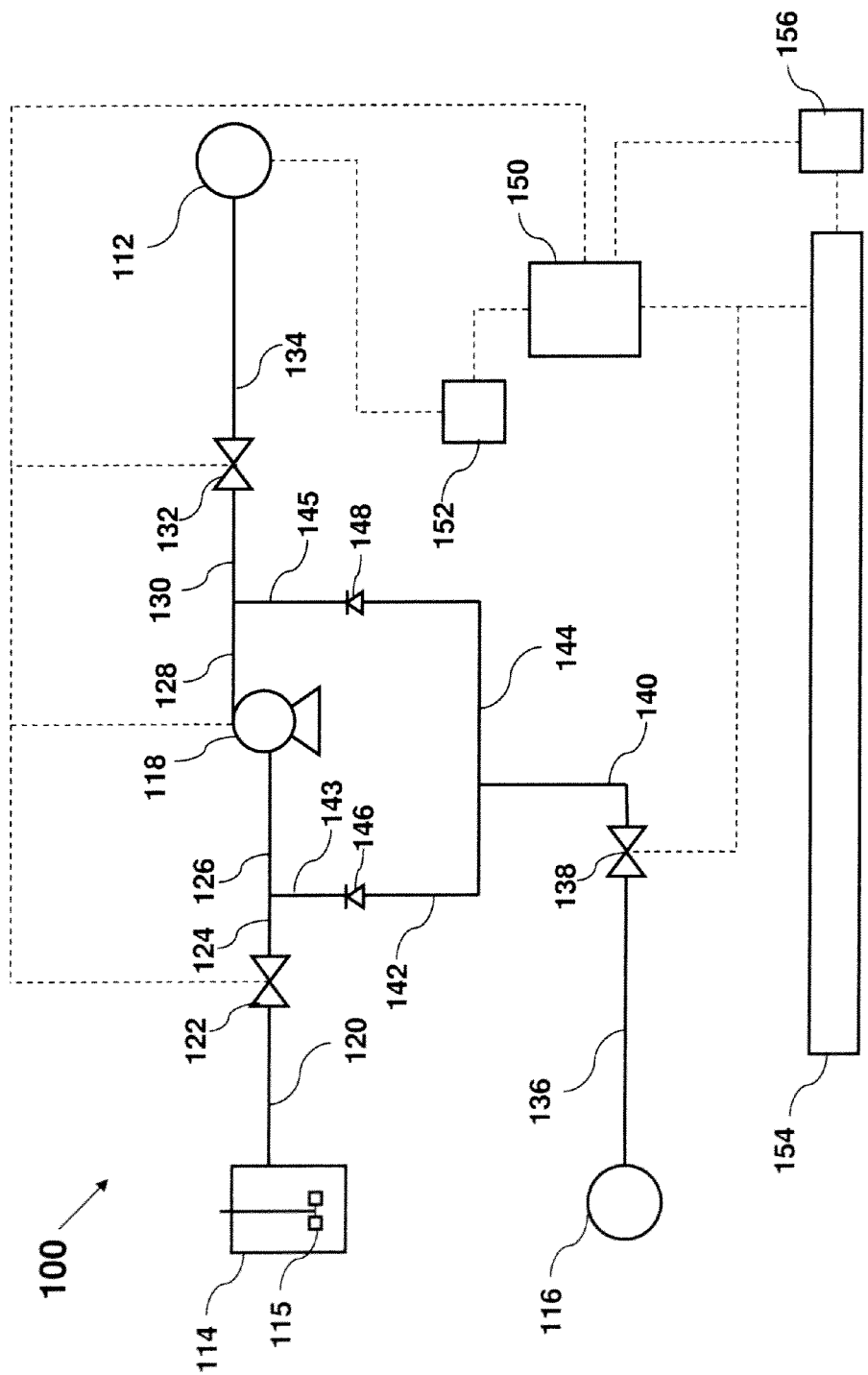
FIG. 1 is a schematic illustration of a system in accordance with one or more aspects of the invention.

The invention is not limited in its application to the details of construction and arrangement of components, systems or subsystems set forth in the description, including the various examples or as illustrated in the drawings. The invention is capable of other embodiments and of being practiced or of being carried out in various ways. The terms used herein for the purpose of description should not be regarded as limiting. The use of the terms "comprising," "including," "carrying," "having," "containing," "involving," and the like are to be understood to be open-ended, i.e., to mean including but not limited to. Only the transitional phrases "consisting of" and "consisting essentially of" shall be closed or semi-closed transitional phrases, respectively, as at forth, with respect to the claims.

Use of ordinal terms such as "first," "second," "third," and the like in the specification and claims to modify an element does not by itself connote any priority, precedence, or order of one element over another or the temporal order in which acts of a method are performed, but are used merely as labels to distinguish one element having a certain name from another element having a same name, but for use of the ordinal term, to distinguish the elements.

One or more aspects of the invention can provide or facilitate wastewater treatment systems. One or more aspects of the invention can advantageously provide or facilitate reducing costs typically associated with operation of a wastewater treatment system and, in some cases, increase the operational availability and reliability thereof. The costs may include lost time due to shutdown periods required to unclog conduits used to deliver treating agents or treating slurries to a fluid, such as a wastewater stream.

A "parameter" is typically a measured or calculated quantity. Examples of parameters include, but are not limited to, pH, time, flowrate, viscosity, temperature, pressure, tank level, tank volume, concentration, oxidation-reduction potential, turbidity, mass, and volume. Process parameters can also be intrinsic quantities such as, but not limited to, expansion coefficient, enthalpy, boiling point, freezing point, density, thermal conductivity, and heat capacity. Parameters may involve an indication or condition of a component of the treatment system of the invention. For example, any of energize, open, de-energize, close, or stand-by may be measured parameters in accordance with some configurations of the invention.

A "triggering condition" or "trigger" refers to one or more requirements, prerequisites, or restrictions that must be satisfied before a change can be initiated or accepted. For example, a threshold parameter can invoke a triggering condition by requiring a parameter, which can be a measured, inferred, and/or calculated quantity, to meet or exceed a predetermined value. The latter can be a predetermined or preset constant but can also vary with respect to the triggering condition or vary depending on a control algorithm.

The terms "sewer" and "sewage collection system" refer to a conduit, or a series and/or a network of conduits that may be interconnected through one or more pumps or lift-stations. The terms "treatment system" and "treatment facility" refer to any system in which fluid, typically wastewater and/or sewage, is treated, processed, or otherwise rendered to have at least one undesirable constituent modified, removed, or a concentration thereof, reduced therefrom.

In accordance with one or more embodiments, the systems and techniques of the invention can be characterized as optimizing the control of odor associated with a fluid, for example a fluid associated with or containing waste products or wastewater derived from coke ovens, asphalt, oil and gas, tanneries, food processing, sewage, wastewater, paper mills, and other manufacturing facilities. The systems and techniques of the invention can also be characterized as providing a control system or controller or utilizing a control system that allows for efficient and cost-effective flushing of a wastewater treatment system or system for controlling odor in a fluid or a wastewater stream to remove, reduce, or minimize clogging associated with a treating agent or treating slurry.

The systems and techniques of the invention can be further characterized as providing one or more controllers or techniques that can regulate the operation of one or more water treatment systems including, hut not limited to, water and/or wastewater treatment systems that typically involve adding, to the fluid to be treated, one or more treating agents, or treating slurries. The systems and techniques of the invention can control or at least effect control of addition of one or more of the treating agents or treating slurries.

As exemplarily shown in FIG. 1, one or more embodiments of the invention can be directed to a treatment system 100 containing fluid to be treated, such as wastewater 112. System 100 typically further includes a source of treating slurry and a source of flushing fluid 116. The source of the treating slurry can be a tank 114 as depicted in FIG. 1 comprising a mixer 115 suitable for maintaining the solids in suspension within the treating slurry. A pump 118 is disposed to introduce treating slurry to wastewater 112 by pumping treating slurry from the source of treating slurry through conduit 120, valve 122, conduit 124, conduit 126, conduit 128, conduit 130, valve 132, and conduit 134 to wastewater 112. The pump 118 may also be used to introduce a flushing fluid into any one or more of the conduits by pumping flushing fluid from the source of flushing fluid 116 through conduit 136, valve 138, conduit 140, and either conduits 142 and 143 or conduits 144 and 145 to flush at least part of the conduit comprising conduit 120, 124, 126, 128, 130, and 134. Typically, the treating slurry and flushing fluid is pumped through the system for predetermined periods of time. In certain embodiments, it may be desirable to place the juncture of conduit 143 and conduits 124 and 126 as close to tank 114 as possible. Likewise, it may be desirable to place the juncture of conduit 145 and conduits 128 and 132 as close to the wastewater 112 as possible.

Other configurations of the invention may not involve pump 118 to introduce flushing fluid from the source of flushing fluid 116. For example, if the source of flushing fluid is pressurized or at least has a pressure greater than the pressure losses associated with flowing the fluid through any of the conduits and valves, then the pump may be bypassed.

Pumps used in the system and techniques of the invention can be any pump suitable for delivering one or more treating agents or treating slurries to a fluid, such as a wastewater stream. For example, pump 118 can be a positive displacement pump such as a peristaltic pump, a diaphragm pump, or a progressing cavity pump. In certain embodiments, the pump may be a variable speed pump to accommodate fluctuations in demand associated with treating the fluid. The valves used in the system and techniques of the invention may be any device that regulates the flow of fluid by opening, closing or partially obstructing a passageway or conduit. A valve in an open position or partially open position allows fluid to flow in a direction of higher pressure to lower pressure. A valve in a closed position prevents fluid from flowing therethrough. The valves used in the present system in techniques may include, for example, ball valves, butterfly valves, check valves, ceramic disc valves, and piston valves.

A treating slurry can be used in the present invention for treating a fluid such as a wastewater stream or any fluid in which it is desired to have at least one undesirable constituent removed, or a concentration thereof, reduced therefrom. The slurry may comprise any mixture of solids suspended in a liquid, in which the solids, and/or liquid are suitable for treating a fluid. The solids and/or liquid may be suitable, for example, for removing at least one undesirable component, or reducing a concentration of at least one undesirable component from a fluid to be treated. The solids may comprise particular treating agents, for example, alkaline earth hydroxides such as calcium hydroxide, magnesium hydroxide, and mixtures thereof. Other suitable treating agents may be used such as nitrate containing species or other alkaline materials. Particularly advantageous agents of the invention can affect at least one characteristic of the fluid. Non-limiting examples of treating agents include acids, bases, oxidizers, disinfectants, as well as those commercially available as BIOXIDE® solution, BIOXIDE® AE slurry, BIOXIDE-AQ® slurry, Alk AQUIT™ 25 slurry, and ODOPHOS® ferrous iron solution, each of which is available from Siemens Water Technologies Corp., Warrendale, Pa.

The liquid of the treating slurry utilized is typically water, but can be any other suitable liquid for mixing the solids component of the slurry, allowing the solids component to remain in suspension to form a suitable slurry for introducing into a fluid to be treated. The liquid may comprise components dissolved or blended therein, such as additional treating agents such as anthraquinone.

The slurry may comprise any mixture of solids suspended in a liquid that may allow the slurry to flow through a conduit to be introduced to a fluid to be treated. In certain embodiments, the treating slurry can have a weight % of less than about 35%, about 30%, about 25%, about 20%, or about 15%, depending on the particular solids and liquids utilized. The slurry may be referred to as a milk, or a thin slurry having a weight percent of solids that allows the slurry to readily flow. A milk of lime slurry may refer to a treating slurry comprising calcium hydroxide or magnesium hydroxide, or mixtures thereof, having a weight % of less than about 15 weight % to about 30 weight %, more particularly, about 20 weight % to about 25 weight %. In certain embodiments, the treating slurry may have a viscosity less than about 1000 centipoises.

The flushing fluid utilized in the systems and techniques of the invention can be any fluid suitable for introducing to a system to cleanse, unclog, unfoul, rinse, wash, disinfect, scour, purge, sterilize, dissolve or otherwise remove any solids accumulated in any portion of the system including conduits, pumps and valves between a source of a treating slurry and a fluid to be treated. The fluid can be water or an acidic solution, such as a solution of hydrochloric acid. The flushing fluid may be a dilute acid solution, for example, a 1 to 10 dilution, a 1 to 100 dilution, or a 1 to 1000 dilution of acid in water. In certain embodiments, the flushing fluid utilized can be a solution of 1 part hydrochloric acid solution to 100 parts water.

In certain embodiments, the flushing fluid can be compatible with the fluid and solids of the treating slurry and/or the fluid to be treated such that no chemical reactions occur between the flushing fluid and the liquid and solid components of the treating slurry, or between the flushing fluid and the components of the fluid to be treated.

In operation of the treatment system 100, in a first mode, or treating mode, treating slurry from tank 114 is delivered to wastewater 112 using pump 118 through conduits 120, 124, 126, 128, 130, and 134. Valves 122 and 132 are in the open position, and valve 138 is in the closed position. In a second mode, or a flushing mode, flushing fluid from the source of flushing fluid 116 is delivered through valve 138 in an open position. In a forward flushing mode, valve 13 remains in an open position, and valve 122 is in a closed position. Flushing fluid from the source of flushing fluid 116 is delivered to wastewater 112 using pump 118 in the forward direction, allowing the flushing fluid to be delivered through conduits 136, 140, 142, 143, 126, 128, 130, and 134. Flushing fluid may also enter conduits 124 and 145. Operating the system 100 in this flushing mode allows removal of any materials that may be inhibiting or reducing flow of treating slurry in a portion of the system that delivers treating slurry to the wastewater 112 through at least conduits 126, 128, 130, and 134 and valve 132 to the wastewater. Check valves 146 and 148 prevent the flow of treating slurry into conduits 142 and 144, respectively.

In an additional or alternative second mode, or flushing mode, flushing fluid from the source of flushing fluid 116 can be delivered to wastewater 112 using pump 118 in the reverse direction. In this reverse flushing mode, flushing fluid from the source of flushing fluid 116 is delivered through valve 138 in an open position. Valve 132 is in a closed position, and valve 122 is in an open position. Flushing fluid from the source of flushing fluid 116 is delivered to the source of treating slurry 114 using pump 118 in the reverse direction, allowing the flushing fluid to be delivered through conduits 136, 140, 144, 145, 128, 126, 124, and 120. Flushing fluid may also enter conduits 143 and 130. Operating the system 100 in this flushing mode allows removal of any materials that may be inhibiting or reducing flow of treating slurry in a portion of the system that delivers treating slurry to the wastewater 112 through at least conduits 120, 124, 126, and 128 and valve 122 to the source of the treating slurry. As noted above, check valves 146 and 148 prevent the flow of treating slurry into conduits 142 and 144, respectively.

The treating slurry may be delivered to the water to be treated for various predetermined treating periods, based on the needs of the particular system. In some embodiments, the treating period may be one day, while in other circumstances, the treating period may be in the range of about 15 minutes to about 180 minutes, and more typically, the treating period may be in the range of about 30 minutes to about 120 minutes. The flushing fluid may also be introduced to the system for various predetermined flushing periods. The predetermined forward flushing period and reverse flushing period may be the same period of time or different periods of time. For example, the forward flushing time period may be in the range of about 30 seconds to about 180 seconds, while the reverse flushing time may be in the range of about 10 seconds to about 180 seconds. More typically, the predetermined forward flushing time is in the range of about 60 seconds to about 180 seconds, and the reverse flushing time is in the range of about 20 seconds to about 120 seconds.

A secondary containment skid 154 is provided to contain any leaks that may be associated with pump 118, and any one or more of valves 122, 132, and 138, and any one or more conduits 120, 124, 126, 128, 130, 134, 136, 140, 142, 143, 144, and 145. A sensor 156 located in secondary containment skid 154 is in communication with controller 150, and may allow for detection of any leaks that may occur within the system. The leak may be detected based on a sensor monitoring the level of liquid within the secondary containment skid, which may trigger an alarm by sound, light, telephone, internet, or other electronic communication to notify an operator of a potential leak within the system.

The conduits referred to herein to introduce treating slurry into the wastewater stream can be of any suitable diameter to transfer the treating slurry through the system and into the wastewater stream. In certain embodiments of the invention, the conduits may be nominally ½ inch in diameter or less. The suitable diameter may be based, in part, on the flowrate of the treating slurry through the system, in that a higher velocity will allow for a smaller diameter conduit. In conventional treatment systems, it would not have been expected that a ½ inch diameter conduit or hose could successfully transfer the treating slurry into a wastewater stream as presently described herein due to clogging that typically occurs when using a slurry having the solids weight percent as used in the systems and techniques of the present invention. However, based at least in part on the systems and techniques of the present invention, a ½ inch diameter conduit is suitable for successful delivery of treating slurry to a fluid to be treated.

In certain embodiments, the controller 150 can facilitate or regulate the delivery of treating slurry to the wastewater, or the delivery of flushing fluid to the conduits. For example, a controller may be configured to adjust the flowrate of the treating slurry or the flushing fluid, actuate the valves, for example, in an open position or a closed position, and to energize the pump, for example, by adjust the pump speed, and starting or stopping the pump. The controller can energize the pump in a treating mode to deliver at least a portion of the treating slurry to a wastewater. The controller may also be further configured to energize the pump in a first flushing mode that introduces the flushing fluid to a conduit that connects the source of the treating slurry to the wastewater, and to energize the pump in a second flushing mode that introduces the flushing fluid to the conduit.

The controller 150 may respond to signals from one or more timers (not shown) and/or one or more sensors, exemplarily shown in FIG. 1 as sensors 152 and 156 positioned at any particular location within the fluid delivery system. The timers may be set to predetermined periods of time, inputted by an operator, for periods of time related to introducing the treating slurry to the fluid to be treated, and/or for periods of time related to flushing of the system, in at least one of a forward or reverse direction, which may be stored in the controller. The predetermined periods of time may vary based on the time of day, the week, month, or season, and may be adjusted based on measured or calculated parameters of the system. The predetermined periods of time may also be adjusted based on operator input, such that if there is an immediate need to adjust the predetermined periods of time, this may be accomplished by an operator overriding the predetermined periods.

The treating mode and the flushing mode may also be initiated based at least in part on a measured parameter of the system. For example a sensor may be disposed to measure a flowrate of the treating slurry that is introduced into the wastewater. The sensor may be disposed in any conduit between the source of the treating slurry and the wastewater. The controller may be configured to compare the measured flowrate to an expected flowrate of the treating slurry to be introduced into the wastewater, and a change in mode may be initiated based on the comparison.

The controller can also comprise a control system that can be used to match a treating slurry dose or flowrate to an actual demand, e.g., odor control, of, for example, a fluid such as a wastewater stream. The feed control system can dynamically feed a treating slurry, e.g., a calcium hydroxide or magnesium hydroxide slurry, based on a curve that matches continuously changing system demands. This reduces overfeeding and underfeeding of the treating slurry, thereby improving performance and reducing treatment costs.

One or more embodiments of the systems and techniques of the invention may be utilized, adapted, or otherwise incorporated into and at least partially control, regulate, provide, maintain, reduce, and/or eliminate one or more characteristics of a wastewater system. In some cases, some embodiments of the invention may be incorporated or utilized to facilitate treatment of wastewater to change at least one characteristic thereof from having an undesirable condition to having an acceptable condition or quality. In particular instances, some control systems and techniques of the invention may be utilized or incorporated in a sewer, sewage collection system, or conveyance system of, for example, a municipality, which typically include at least one treatment facility wherein sewage or wastewater is treated. In other cases, the present inventive systems and techniques may be used in one or more subsystems of the sewage system. The invention, however, is not limited in its application to wastewater systems and/or components thereof. The invention may be utilized in other municipal, commercial, and/or industrial operations that involve monitoring, regulation, and/or management of at least one characteristic of one or more process fluids and, in some cases, at least one associated source of chemical or biological reactant or agent, such as a treating slurry. Thus, although the various aspects, features, and advantages of the invention are described relative to a treatment facility, the invention is not limited to such facilities and may be incorporated in such other operations. Thus, the systems and techniques of the invention may be utilized to regulate and at least partially change a water body or stream from having an unfavorable condition to one having a preferred condition. For example, the systems and techniques of the invention may be utilized to control, regulate, and/or facilitate any of a biological process, a chemical process, or combination thereof.

Further aspects and features of the invention advantageously provide adaptive control approaches or methodologies to alter, monitor, limit, restrict, manage, control, regulate, reduce, or even minimize at least one characteristic of a treatment facility or a component thereof. In other cases, however, the aspects and features of the invention provide adaptive control approaches or methodologies that increase or even maximize at least one characteristic of a treatment facility or a component thereof. For example, one or more aspects of the invention may be directed to reducing or minimizing a concentration or activity of one or more particular species, products, byproducts or properties of one or more fluid streams in the treatment facility. Alternatively, some aspects of the invention may be directed to increasing a concentration of one or more particular species, products, byproducts or properties of one or more fluid streams in the treatment facility.

In one or more particular aspects, the invention can involve a method of controlling addition of a treating agent into a fluid. For example, one or more methods of the invention can comprise one or more acts of measuring at a measurement site a process value of a process parameter of the fluid and generating a first control signal based on a control function and the process value. The methods of the invention, in some cases, can further involve one or more acts of introducing an amount of the treating slurry, based on the first control signal into the wastewater, measuring at least one operating parameter of a source of the wastewater, and generating an expected operating value of the source of the treating agent, typically based at least partially on the first control signal. One or more methods of the invention can further comprise one or more acts of measuring a plurality of process values of the process parameter. In still other cases, one or more methods of the invention can comprise one or more acts of generating a plurality of control signals, preferably based on the control function and the plurality of process values, and/or generating a plurality of expected operating values of the source of the treating agent, typically based at least partially on the plurality of control signals as well as, or in conjunction with, one or more acts of generating an alarm condition, typically when a magnitude of a difference between at least one expected operating value and at least one measured operating parameter of the source of the treating agent exceeds a predetermined tolerance value.

Still further aspects of the invention can be directed to feed system, such as chemical feed systems. One or more systems of the invention can comprise at least one sensor disposed to measure a first parameter of a wastewater stream, such as, for example, the pH, and to transmit a first measurement signal corresponding to the first parameter. In some cases, the system may further comprise at least one source of a treating slurry disposed to introduce the treating slurry into the wastewater stream. Particularly preferred embodiments of one or more systems of the invention can comprise one or even a plurality of controllers, wherein at least one controller is in communication with the at least one sensor and at least one, or the same controller is in communication with at least one source of one or more treating agents. One or more controllers can, in some systems of the invention, be configured to receive at least one of the first measurement signal from the sensor and a second measurement signal corresponding to a measured parameter of at least one source of the treating slurry. The measured parameter of the at least one source of the treating slurry may be, for example, the level of the treating slurry in the tank housing the treating slurry. Further, at least one, but typically the same, controller can be configured to transmit to at least one source of the treating agent at least one control signal based at least in part on a control function and the first measurement signal.

As noted, the measured parameter can be representative of a level of the wastewater stream. For example, the at least one input device can comprise at least one sensor that provides at least one measured value corresponding to a pH of the wastewater stream downstream of the point of addition of the treating slurry. Typically, it would be desirable to maintain the pH of the wastewater stream to be treated in the range of about 7.5 to about 9.0.

In other examples, the measured parameter can be a concentration of a species in the wastewater stream. The species may include sulfides, such as hydrogen sulfide, iron sulfide, dimethyl sulfide, and dimethyl disulfide; mercaptans; and other odorous species or compounds located in wastewater streams.

In some embodiments of the invention the pH sensor is disposed to measure a pH of, for example, a wastewater stream, and transmit at least one corresponding measured pH value to at least one controller of the system. In further pertinent embodiments of the invention, at least one controller can then be configured to generate at least one composite average pH curve based on at least one of the measured pH value and, in particularly advantageous cases, also be configured to identify a triggering condition based at least partially on the composite average pH curve and a currently measured pH value. One or more sensors can be remotely disposed from a point of introduction of the treating slurry into the wastewater stream. The triggering condition can be realized when, for example, a difference between the composite average pH curve and the current measured pH exceeds at least one predetermined tolerance value. Indeed, some preferred embodiments of the invention involve at least one controller that is configured, or at least is configurable, to adjust the control signal based on at least one triggering condition. Other sensors may be disposed to measure other parameters of the system to produce composite curves based on at least one other parameter, and to be used advantageously in the systems and methods of the invention.

Further embodiments of the invention utilize one or a plurality of sensors configured to measure and preferably provide an indication of an operating parameter or a component or subsystem of the systems of the invention. As noted, the operating parameter can be a state or condition and the sensor can thus provide an indication or representation of the component or subsystem. For example, one or more systems of the invention can comprise at least one sensor disposed to measure a flowrate or pressure of the treating slurry at various points throughout the system, the current driving one or more pumps of the system, or the temperature of the wastewater stream.

In some cases, the flowrate of the treating slurry can be measured to further improve the control techniques of the invention. For example, flow pacing techniques may be further utilized to adjust the rate of treating agent introduced into the wastewater stream. Such techniques typically determine a treating slurry dosage rate based on, for example a typical or design flowrate, and further decreases the dosage rate during periods of relatively increased wastewater flow or increases in the dosage rate during periods of relatively reduced wastewater flow. Typically, the dosage rate can be reduced relative to a normal control basis because the amount of time the wastewater remains in the sewage collection system decreases, which in turn decreases the potential or amount of sulfide produced during transit. In contrast, simple flow pacing techniques inappropriately tends to increase the dosage rate during high flow periods when it should be decreasing the dose rate so as to reflect the reduced system demand. Thus, some embodiments of the invention can comprise utilizing a residence time of the wastewater as a basis for controlling addition of a treating slurry. As noted, controlling addition of the treating slurry can be based on the measured process value, typically relative to a corresponding demand value of a control function. The control function can further incorporate adjusted flow pacing techniques of the invention to adjust, during, for example, relatively high fluid flow rates, the control signal, and effectively reduce the dosage rate of the treating slurry by nesting the flow pacing algorithm. The systems and techniques of the invention, however, can be practiced in other ways. For example, the adjusted flow pacing approach of the invention can be utilized to control a first pump configured to introduce a first treating slurry into the wastewater stream, or a portion of one or more treating agents into the wastewater stream at a first dosage rate, whereas the generated control signal based on the measured process value representing a concentration of one or more odorous species and a demand value can be utilized to control a second pump configured to introduce a second treating slurry or treating agent or the first treating slurry at a second dosage rate.

The control function, or feed profile, can comprise a plurality of demand values. In some embodiments of the invention, a plurality of demand values can be used to constitute an array of demand values that can at least partially define one or more control functions. Particularly advantageous aspects of the invention can be facilitated by utilizing at least one measured value from at least one input device and a control function or at lest one demand value thereof. For example, in some embodiments of the invention, at least one process parameter is monitored to provide a measured process value. The process value corresponding to a demand value of a control function can then be utilized to control and provide a corresponding control signal. For example, a measured value at the first hour, or other time interval, of a day can be used with a demand value assigned for the same hour, or other time interval. If an hourly array of demand values is predefined or predetermined, through measurements or otherwise, and provided, then the process parameter can be measured hourly and the corresponding measured value, along with the corresponding hourly demand value can be used to provide a control signal. The control signal can then be utilized to, for example, energize one or more pumps or actuate one or more valves of one or more sources of a treating agent. The systems and techniques of the invention can thus control treatment based on a control function that can have a plurality of control targets or set points.

In some embodiments of the invention, at least one of the measured value and the operating parameter is determined periodically, or upon demand. Thus, in some cases, a measured value of a characteristic or condition of the wastewater stream is measured in accordance with a predetermined schedule. For example, the pH of the wastewater stream downstream of the point of introduction of the treating slurry can be measured by at least one input device at periodic intervals and thus provide a plurality of measured values of at least one process parameter of the fluid. If, for example, the process parameter is sampled hourly, then an array comprising twenty-four periodic process values would be measured daily. The array can also be configured based on a daily or weekly demand profile. For example, a set of control points or demand values can comprise one or more demand functions. Indeed, the control function can be defined on a daily, weekly, monthly or seasonal basis. In particular embodiments of the invention, a control function is defined for each day of the week thereby being adapted to accommodate, for example, seven sets of twenty-four hourly demand values. The invention, however, is not limited to embodiments involving hourly measurements and may be practiced utilizing other sampling rates. Moreover, the sampling rates need not be uniformly periodic and may be temporally asymmetrical in which the sampling rate can be greater at certain periods of, for example, an hour, day, week, or month relative to other periods of the day, week, and/or month.

Further optimization can be realized during changes in the diurnal flow profile commonly exhibited in municipal wastewater systems. For example, the demand values can be dynamically adjusted based on historically measured process values. The control techniques of the invention can self-adjust at least one demand value of one or more control function based on, for example, past measured data. For example, if a measured process value is measured or determined to be greater than an historical average, the systems and techniques of the invention can adjust a corresponding hourly, daily, weekly, or even monthly, demand value. The historical average can be determined on a daily basis, e.g., as an average of measured value of the corresponding hours of a day; on a weekly basis, e.g., as an average of measured values of the corresponding hours of a week; or even on a seasonal or yearly basis.

Safeguards can also be incorporated to ensure stable control of the system. For example, the adjusted demand value can be limited to a predetermined percentage of the original demand value, such as, within about 10%. Other control limits may be utilized including, but not limited to requiring operator confirmation of any change in predefined demand values, or even requiring a hierarchical approval relative to the magnitude of change. For example, a relatively low percentage change, e.g., less than about 2% may be effected without approval, whereas an intermediate percentage change, e.g., less than about 10% may be adopted with operator-level approval, and any high percentage change, e.g., greater than about 10% may be incorporated with supervisory-level permission.

In one or more embodiments of the systems and techniques of the invention, at least one controller can be configured to receive, for example, the second measurement signal and generate a measured characteristic value of at least one operating parameter of at least one source of the treating slurry. Further, at least one controller can be further configured to generate an expected characteristic value of at least one source of the treating slurry based at least in part on at least one control signal, and/or to determine a relative characteristic value based on the difference between the measured characteristic value and the expected characteristic value.

For example, as noted, the control systems and techniques of the invention can generate a control signal based at least partially on a measured value of a process parameter and a corresponding demand value of a control function. The measured value can be measured, for example, at a first minute and the control signal can be based on a difference between the measured value and the demand value as pre-designated for that first minute. Other measurements of, for example, temperature, flowrate or other parameters, can be performed every minute, or at other time intervals, and would then be used along with corresponding demand values. The plurality of periodic control signals can then be used to generate an aggregate or total, corresponding to a treating slurry dosage amount. The aggregate dosage amount can then be used to estimate an expected operating parameter, condition, or value of, for example, the source of the treating slurry. Some embodiments of the invention further comprise one or more input devices to monitor or measure at least one operating parameter of the source of treating slurry. The aggregated dosage amount can then be advantageously compared to the expected operating value or parameter. If a difference between the measured and expected operating conditions or values exceeds a tolerance, or a setpoint, then one or more actions can be initiated by the systems and techniques of the invention. For example, if the measured pH exceeds the tolerance or setpoint, the flowrate of the treating slurry is decreased. If the measured pH falls below the tolerance or setpoint, the flowrate of the treating slurry is increased. For example, if the difference exceeds a measurement error limit, then an alarm condition can be generated and transmitted to one or more output devices, thereby, in some cases, requiring the attention of the operator.

Further embodiments of the invention may allow generation of one or more control signals corresponding to a level of fluid in the system, for example, a level of fluid in one or more subsystems such as a tank within the system, or one or more skids such as a containment skid for containing leaks that may occur within the system. One or more sensors may monitor or measure the level of fluid, and a control signal may be generated corresponding to this measured level. The measured level can be advantageously be compared to the expected operating conditions or parameter, and if the difference between the measured and expected operating conditions or parameter exceeds a tolerance, then alarm condition can be generated and transmitted to one or more output devices to allow for one or more actions to be carried out by an operator or otherwise.

Further embodiments of the invention facilitate maintaining a sufficient amount of the one or more treating slurries. In some cases, the composite average and/or the measured operating parameter of one or more sources of at least one treating slurry can be utilized to initiate and/or notify when the stored amount of treating slurry should be replenished. For example, when the measured amount of the treating slurry in at least one source is at or approaches a percentage of the total storage amount, the systems and techniques of the invention can send a notification by, for example, an alarm, and/or printed or electronic message. In some cases, the condition for replenishing can be triggered relative to an anticipated number of days of treating slurry remaining. This condition can be determined based on, for example, the rate or usage of a treating agent and the remaining volume.

In accordance with one or more embodiments of the invention, the systems and techniques of the invention may be configured to recognize conditions that obviates or reduces the need for treating slurries. The systems and techniques of the invention can thus be further configured to adjust, e.g., reduce or minimize, the control signal during such reduced demand conditions. For example, rain can increase the flow rate of the fluid in sewer systems. The increased flow condition can be manifested as a direct flow meter measurement and/or increased pump current draw. The increased flow rate, depending on the amount of precipitation, can effectively reduce or even eliminate the amount or dosage rate of treating slurry because, as discussed above, of the effectively reduce fluid residence time and/or, in some cases, because of dilution effects. Thus, some embodiments of the systems and techniques of the invention can be configured to recognize elevated fluid flow rates associated with rain, which can also be referred to as rain curves. Moreover, some embodiments of the invention contemplate adjusting or controlling of the amount or dosage rate of the treating agent based on the rainfall amount. For example, a flow sensor or pump activity level can be utilized to measure a fluid flow rate; if the measured flow rate increases in a relatively short period such as within less than about six hours, and in contrast to a weekly or monthly historical increase, then the treating slurry dosage amount or rate can be reduced accordingly. Further embodiments contemplate a staged control approach, utilizing, for example, a plurality of rain curves to modify at least one output signal. For example, during an abnormally high flow condition, a dosing reduction factor can be initiated. Further rain curves can be used to define the factors; typically, greater rainfall directs a larger adjustment factor.

In some cases, the measured flow rate can be classified as or according to a composite average flow rate. Further, a deviation from the composite average flow rate, which can be defined as an average, e.g., a moving average, of fluid flow rates, can be utilized in adjusting the treating slurry amount or dosage rate. For example, the treating slurry amount and/or dosage rate can be reduced to a first level or percentage for a first predetermined rainfall amount and to a second level or percentage for a second predetermined rainfall amount. Further levels of adjustment can be utilized as desired. Other embodiments may further utilize safeguards to avoid false positive determination of rainfall events. For example, a predetermined tolerance condition or value may be used to validate a triggering condition indicative of the rainfall event and/or avoid chattering nuisance. If, for example, the amount or rate of fluid flow increases by certain predetermined value, e.g., greater than about 10% of, for example, the composite average flow curve, then a rainfall event is considered likely and an adjustment of the amount and/or dosage rate would be accordingly initiated. Other predetermined tolerance conditions or values may also be utilized, alone or in conjunction with the above approach. For example, the tolerance condition may require consecutive elevated measured fluid flow rates, relative to the composite average flow curve, before the triggering condition is recognized or acknowledged.

Other nested or ancillary control loops may be incorporated into or around the treating slurry dosage rate control block. Analogous to adjusted flow pacing, the pH and/or temperature of the fluid may be used to decrease, increase, or otherwise adjust the control signal directed to, for example, the dosage rate of the treating slurry. For example, where the temperature of the fluid is elevated, especially relative to a baseline such as ambient temperature or about 20 C, the dosage rate can be increased to counteract an increase in biological metabolic activity. If biological activity can be considered to approximately follow an Arrhenius temperature dependence, then the dosage rate can be increased to accordingly compensate for a doubling of activity or rate of generation of odorous species for every 10° C. increase. Conversely, during colder periods, e.g., when the sewage fluid temperature approaches about 12° C. to about 13° C., the control signal can be reduced to accordingly accommodate reduced activity associated with lower temperatures. Analogously, pH based adjustments may be utilized to compensate odorous species generation during periods of higher and lower fluid pH conditions. The pH and/or temperature adjusted control blocks or algorithms can be nested with the any of the other control blocks or algorithms.

The control signal, in some embodiments of the invention, can actuate, activate, or otherwise facilitate energizing, and/or de-energizing at least one unit operation of the systems and techniques of the invention. At least one control signal, in some embodiments, can involve time-splicing by comprising at least one active component and at least one dormant component. In some cases, for example, the control signal can be a composite signal comprising a plurality of output drive signals, one or more of which may, at any or desired period or cycle, energize or de-energize at least one unit operation of the system. In such cases, for example, the magnitude of the active component can, preferably, be a function of a characteristic of at least one component of the system of the invention and a control quantity. For example, control signal, or an active component thereof, can, at least partially, be based on a difference between a measured parameter and a demand value. The control signal can, for example, be based on the difference between the first measured parameter and a corresponding demand value. Alternatively, or in accordance with other embodiments of the invention, the control signal can be, at least partially, defined as an active component of duty cycle period. The duty cycle can comprise periods, typically alternating active periods with dormant periods that energize and de-energize at least one unit operation of a subsystem of the treatment system. For example, the control signal can be comprised of a duty cycle including at least one active period that instructs or otherwise energizes an unit operation to, for example, perform a predetermined procedure or task, and can further be comprised of at least one dormant period that instructs or otherwise de-activates the unit operation from performing the procedure.

The control signal may be manifested in terms of a duty cycle having a predefined time period. Indeed, advantageous embodiments of the invention can involve control signals that are at least partially based on a duty cycle, having a plurality of active and dormant periods. Particularly advantageous embodiments involve control signals with duty cycles in which the temporal magnitude of an active period is biased relative to the temporal magnitude of a dormant period. For example, the duty cycle can be predefined to be a one minute cycle, then an active period of the control signal can be a fraction of one minute, e.g., six seconds or 10% of the duty cycle; twenty seconds or about 33% of the duty cycle; or thirty seconds or about 50% of the duty cycle. The corresponding dormant period of the duty cycle would, respectively, be 54 seconds or about 90% of the duty cycle; forty seconds or about 66% of the duty cycle; or thirty seconds or about 50% of the duty cycle. As noted, the duty cycle can be a predefined quantity and is not limited to one minute cycles. For example, the duty cycle can be predefined as three minutes, ten minutes, or even sixty minutes. Defining a duty cycle can be established for each dosing assembly or system and may even vary and be a function of one or more factors including, for example, deviations from expected values, such as errors in expected relative to actual values, and even based on the time, day, month, and/or season.

The control signal may be further modified as desired by applying one or more adjustment factors. For example, with respect to an output signal directed to dosing one or more treating agents, one or more dosing adjustment factors can modify the control signal, typically, the magnitude and/or, in some cases, the duration of the active component of the output signal. The dosing adjustment factor can be applied to modify a rate or amount of treating slurry introduced to the wastewater stream. For example, a global dosing adjustment factor can be used to reduce the amount and/or rate of a calcium hydroxide containing treating slurry by about 5%, by about 10%, about 15%, or even by about 20%, depending, for example, on one or a plurality of conditional requirements that can trigger each level of adjustment. In some cases, a plurality of dosing adjustment factors can be employed, any one or more of which can have one or a plurality of conditions that must be present before being activated. For example, a dosing adjustment factor can conditionally be activated only during rainfall events, during a predetermined part of a day, week, month, or year.

Various embodiments of the invention can further comprise one or more acts of modifying at least one demand value of the control function and/or generating an alternative control signal based at least partially on the modified demand value and a second measured process value of the process parameter. The process parameter, in some particular embodiments of the invention, can be representative of a concentration of an odorous species in the wastewater stream. The measured first parameter in one or more systems of the invention can be representative of a concentration of a species in the wastewater stream. In one or more particular embodiments directed to the systems of the invention, the control function can comprise an array of demand values.

The controller may be implemented using one or more computer systems which may be, for example, a general-purpose computer such as those based on in Intel PENTIUM®-type processor, a Motorola PowerPC® processor, a Hewlett-Packard PA-RISC® processor, a Sun UltraSPARC® processor, or any other type of processor or combination thereof. Alternatively, the computer system may include specially-programmed, special-purpose hardware, for example, an application-specific integrated circuit (ASIC) or controllers intended for fluid delivery systems.

The computer system can include one or more processors typically connected to one or more memory devices, which can comprise, for example, any one or more of a disk drive memory, a flash memory device, a RAM memory device, or other device for storing data. The memory is typically used for storing programs and data during operation of the system. For example, the memory may be used for storing historical data relating to the parameters over a period of time, as well as operating data. Software, including programming code that implements embodiments of the invention, can be stored on a computer readable and/or writeable nonvolatile recording medium, and then typically copied into memory wherein it can then be executed by one or more processors. Such programming code may be written in any of a plurality of programming languages, for example, Java, Visual Basic, C, C#, or C++, Fortran, Pascal, Eiffel, Basic, COBAL, or any of a variety of combinations thereof.

Components of the computer system may be coupled by one or more interconnection mechanisms, which may include one or more busses, e.g., between components that are integrated within a same device, and/or a network, e.g., between components that reside on separate discrete devices. The interconnection mechanism typically enables communications, e.g., data, instructions, to be exchanged between components of the system.

The computer system can also include one or more input devices, for example, a keyboard, mouse, trackball, microphone, touch screen, and other man-machine interface devices as well as one or more output devices, for example, a printing device, display screen, or speaker. In addition, the computer system may contain one or more interfaces that can connect the computer system to a communication network, in addition or as an alternative to the network that may be formed by one or more of the components of the system.

According to one or more embodiments of the invention, the one or more sensors for measuring any one or more parameters of the system and/or components may be connected to a communication network that is operatively coupled to the computer system. Any one or more of the above may be coupled to another computer system or component to communicate with the computer system over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms may be affected by utilizing any suitable technique including but not limited to those utilizing wireless protocols.

The controller can include one or more computer storage media such as readable and/or writeable nonvolatile recording medium in which signals can be stored that define a program to be executed by one or more processors. The medium may, for example, be a disk or flash memory. In typical operation, the one or more processors can cause data, such as code that implements one or more embodiments of the invention, to be read from the storage medium into a memory that allows for faster access to the information by the one or more processors than does medium.

Although the computer system is described by way of example as one type of computer system upon which various aspects of the invention may be practiced, it should be appreciated that the invention is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by a controller can be performed in separate computers, which in turn, can be communication through one or more networks.

Further aspects of the invention can involve or be directed to computer-readable media, or providing computer-readable media, that facilitates the various features of the delivery system described herein, including a computer readable medium that can instruct a controller to perform a method of wastewater odor control. The method can include generating at least one first control signal in a treating mode, generating at least one second control signal in a flushing mode, identifying a first triggering condition that initiates generation of the second control signal, and identifying a second triggering condition that re-initiates generation of the first control signal. Identifying the first triggering condition can include monitoring a duration of an elapsed treating time during which the first control signal is generated, and comparing the duration of the elapsed treating time to a target treating period. In addition or in the alternative, identifying the first triggering condition can include measuring a flowrate of the treating slurry introduced into the wastewater, and comparing the measured flowrate to an expected flowrate of the treating slurry to be introduced into the wastewater. Identifying the second triggering condition can include monitoring a duration of an elapsed flushing time during which the second control signal is generated, and comparing the duration of the elapsed flushing time to a target flushing period.

Figure 2:
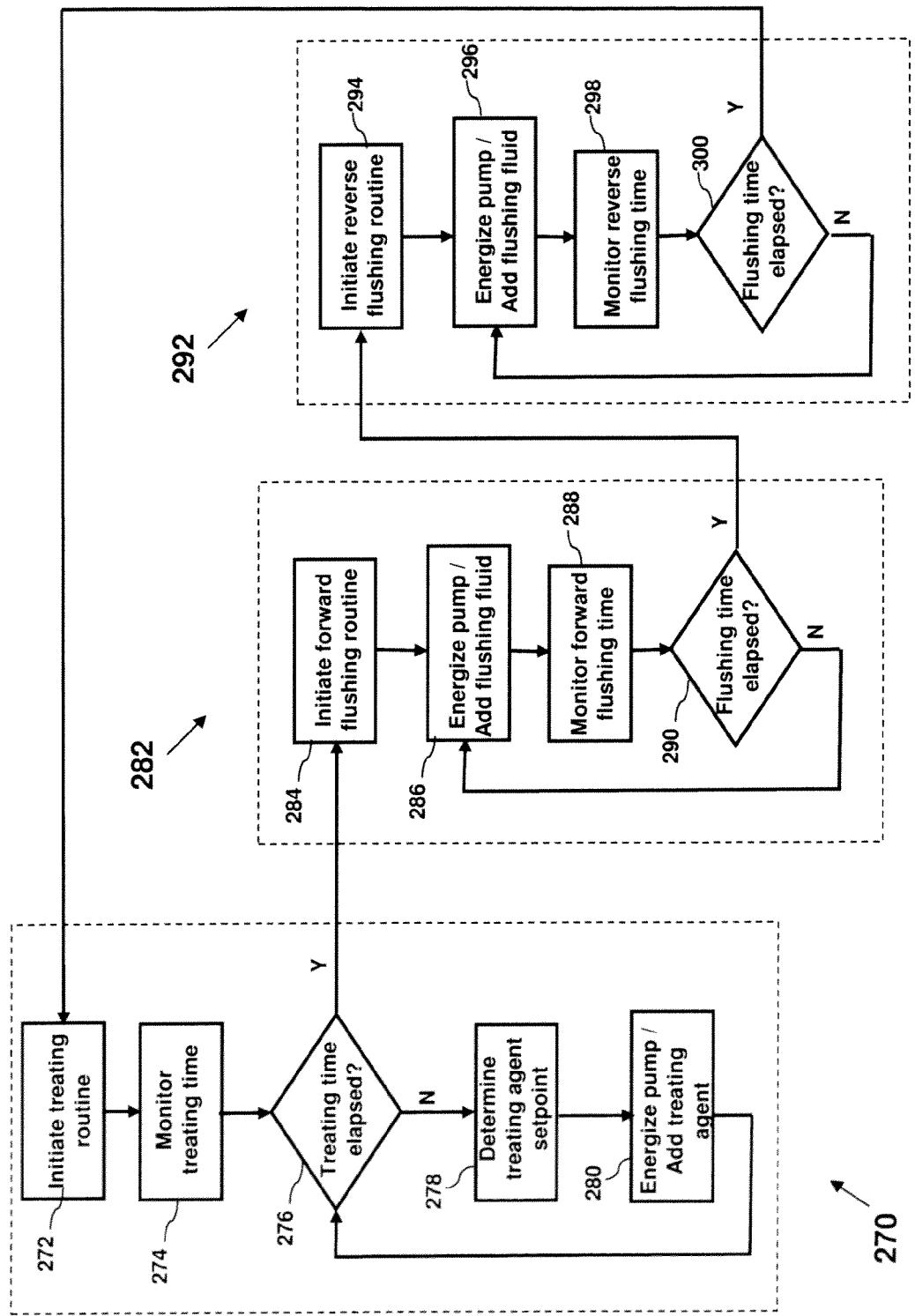
FIG. 2 is a flow chart illustrating a process for flushing a system in accordance with one or more embodiments of the invention.

FIG. 2 is a flowchart that exemplarily depicts the operation of one or more systems and techniques according to one or more embodiments of the invention. Although the operation of the system is described primarily with respect to a water treatment method or routine that may be executed by one or more controllers (e.g., controller 118 of FIG. 1), it should be appreciated that the invention is not so limited, and many of the steps described below may be implemented manually, by a person, for example, rather than by one or more electronic, mechanical or electromechanical devices, as discussed in more detail further below. Further other systems and techniques of the invention can be implemented to facilitate treatment or control of addition of one or more reactant species, effect or control a reaction, regulate activity of one or more subsystems, and/or provide a desired condition of the wastewater to be treated, based on one or more characteristic functions.

Prior to entering the routines of FIG. 2, a user is typically requested to input metrics based on a current, desired, and/or acceptable quality of the wastewater stream to be treated, or a current, desired, and/or acceptable quality of the conduits for delivering the treating slurry to the wastewater stream. Characteristics or parameters of the system that may be inputted can be, for example, times associated with a treating routine that allows for delivery of the treating slurry, and times associated with one or more flushing routines, for example a forward flushing routine and a reverse flushing routine. Other characteristics or parameters may include pH, flowrate, temperature, concentration or weight percent of the source of the slurry may also be inputted at this time. For example, the user may be prompted to enter natural parameters pertaining to the water system such as the water volume and/or concentration of disinfecting species to be added as well as parameters related to a desired water quality such as, but not limited to, maximum and/or minimum allowed values for the pH of the wastewater to be treated or a target pH as well as an acceptable range or tolerance by which the pH value may fluctuate, maximum and/or minimum values for the concentration of one or more treating slurries or a target concentration of one or more treating slurries as well as a tolerance by which such concentrations can rise and fall. Where there are applicable mandated municipal, state, federal or other government requirements or guidelines, or where there are safety and/or environmental requirements or guidelines, such values may likewise be entered. It should be appreciated that other parameters may be entered such as, but not limited to, the estimated flow rate of a stream comprised of the water to be treated or make up water, as the invention is not limited to a particular set of metrics. Moreover, physical parameters that may impact treatment, such as a tolerable delay or smoothing time may likewise be entered.

At step 272, the treatment routine 270 can be initiated to allow delivery of the treating slurry to the wastewater stream. The treatment routine monitors the time elapsed at step 274. Other various parameters of the system may be measured, for example, by one or more of the plurality of sensors. Other parameters that may be measured at step 274 may include, but are not limited to, the temperature of the water, the oxidation-reduction potential of the water, the pH of the water, the concentration of the treating slurry in the water, or any combination of these parameters. Other parameters that may be measured at step 274 may include, for example, operational information such as flow rate or fluid level. One or more of the measured parameters of the water system may be temporarily stored in the memory of the controller (e.g., RAM), and/or stored in a less volatile form of memory of the controller, for example, a storage system, to use as historical data which may be utilized to effect various operations of the controller, as discussed more fully below. In some cases, one or more of the measured parameters can be directed to one or more output devices, which can, for example, print and/or transmit the one or more measured values to one or more locally and/or remotely located systems, facilities, and/or stations. For example, the output device can comprise a communication device, such as a transmitter, that can effect a wired or wireless link or connection so that the value of one or more measured parameters, which can be raw, analyzed, or normalized, can be received or collected by one or more corresponding receiving devices.

After monitoring the treating time and, optionally, measuring any other properties of the system, the routine typically proceeds to step 276, wherein the existing or current treating time or other measured parameter is verified to assess whether a change is appropriate. Time or measured parameter verification can be performed by comparing time or one or more measured parameters to the user entered input metrics or a corresponding calculated or expected value. In particular, at step 276, the routine can determine whether a change to a different routine is appropriate. The routine assesses whether a triggering condition is present such as whether the current elapsed time is the inputted elapsed time, and if the current elapsed time is not the same as the inputted elapsed time, for example, less than the inputted elapsed time, then the routine moves on to step 278 to determine a treating agent setpoint. The treating agent setpoint may be based on one or more particular characteristics of the system, for example, the time of day, the pH of the wastewater stream, the flowrate of the wastewater stream, or the temperature of the wastewater stream or the temperature of the treating slurry. The setpoint can further be adjusted based on one or more particular characteristics of the system, for example, the pH of the wastewater stream, the flowrate of the wastewater stream, or the temperature of the wastewater stream or the temperature of the treating slurry. Once the setpoint has been determined, the pump is energized and treating agent is added in step 280, based on the treating agent setpoint, and the routine returns to step 276 to again ascertain as to whether a change to a different routine is appropriate, e.g., whether another triggering condition is present. If the current elapsed time is the same as the inputted elapsed time, the routine proceeds to a new routine, for example the forward flushing routine 282. If the current elapsed time is not the same as the inputted elapsed time, the routine proceeds to steps 278 and 280, and then again returns to step 276.

Once the forward flushing routine 282 is initiated in step 284, the pump is energized and flushing fluid is added to the system in step 286. In step 288, the forward flushing time is monitored, and optionally, any other properties of the system are measured. The routine typically proceeds to step 290, wherein the existing or current treating time or other measured parameter is verified to assess whether a change is appropriate. Time or measured parameter verification can be performed by comparing time or one or more measured parameters to the user entered input metrics or a corresponding calculated or expected value. Based on whether the appropriate flushing time has elapsed, the routine will either return to step 286 to add more flushing fluid, or proceed to a new routine, for example the reverse flushing routine 292, which initiates a similar routine as routine 282 using steps 294 through 300 to flush the system in the reverse direction. The existing or current treating time or other measured parameter is verified in step 300 to assess whether a change is appropriate. Based on whether the appropriate flushing time has elapsed, the routine will either return to step 296 to add more flushing fluid, or proceed to a new routine, for example the treating routine 270.

EXAMPLE

The function and advantages of these and other embodiments of the invention can be further understood from the example below, which illustrates the utility of the one or more systems and techniques of the invention but do not exemplify the full scope of the invention.

This example demonstrates the utility of a flushing system of the present invention that is implemented in a wastewater treatment system that successfully controls odor downstream of the system.

A treating slurry at a concentration of 35 weight % solids was added at a lift station to control hydrogen sulfide emission from a wastewater stream at the list station and downstream of the station. The treating slurry feed rate is dependent, at least, on the wastewater flowrate. Additional factors may include turbulence, temperature, influent dissolved sulfides and alkalinity of the wastewater.

The treating slurry feed system was constructed and installed at the lift station site. This consisted of a 6150 gallon storage tank, treating slurry mixing system, peristaltic pump, VersaDose™ controller from Siemens Water Technologies Corp., and a pH monitor. The treating slurry feed line was placed to feed into a manhole about 50 feet upstream of the lift station. The treating slurry feed at room temperature typically exhibited a pH of 12.4.

A 35 weight % treating slurry comprising calcium hydroxide was delivered to the site and fed on a dosing curve. Feed continued for 3 weeks when the feed control was changed to be driven by the pH of the wastewater entering the lift station. Over the next few weeks, the controller pH set point was adjusted upward until the desired atmospheric pH was attained.

Once a pH set point was established and the required treating slurry feed was determined, a slug of ten gallons of 50% anthraquinone was added at the manhole to determine the effect of adding anthraquinone in concert with the treating slurry.

To improve material handling, the treating slurry was changed to a 25 weight % solids slurry, Approximately 4000 gallons of treating slurry was contained within the storage tank, and mixing of the treating slurry occurred intermittently, as needed. The tank was also periodically rinsed to remove solids build-up on the sides of the tank to prevent precipitation and agglomeration that could contribute to clogging of the system. Water and calcium hydroxide was added to the tank as necessary. The pH was monitored and the feed rate was adjusted based on the pH. Additionally, the flowrate of the treating slurry was measured and compared to a calculated feed rate based on the measured treating slurry tank level to detect clogging of the conduits of the system. Flushing time intervals and time periods were adjusted based on the detection of clogging within the system. The conduits of the system were flushed with water at various intervals and for various periods of time to determine optimal flushing operating conditions. For this particular system, it was determined that optimal treating periods were in the range of from about 30 minutes to about 120 minutes. It was also determined that optimal forward flush periods were in the range of from about 60 seconds to 120 seconds, and reverse flush periods were in the range of from about 60 seconds to about 120 seconds.

For example, the following table depicts flushing intervals and time periods tested.

TABLE 1

Flushing operating conditions tested

| Test | Treating Period (min.) | Forward Flush Period (min.) | Reverse Flush Period (min.) |
|---|---|---|---|
| 1 | 60 | 120 | 120 |
| 2 | 90 | 120 | 120 |
| 3 | 90 | 16 | 120 |
| 4 | 90 | 26 | 180 |
| 5 | 90 | 26 | 180 |
| 6 | 120 | 26 | 180 |
| 7 | 120 | 26 | 180 |
| 8 | 60 | 30 | 180 |
| 9 | 60 | 30 | 120 |
| 10 | 60 | 35 | 120 |
| 11 | 60 | 240 | 120 |
| 12 | 60 | 250 | 120 |
| 13 | 15 | 60 | 60 |
| 14 | 15 | 90 | 90 |
| 15 | 15 | 120 | 180 |
| 16 | 15 | 120 | 170 |
| 17 | 15 | 720 | 180 |
| 18 | 15 | 35 | 180 |
| 19 | 60 | 60 | 60 |
| 20 | 60 | 60 | 180 |
| 21 | 30 | 60 | 60 |
| 22 | 25 | 60 | 60 |

The odor at a downstream lift station was observed to be less by utilizing the odor control system. It is believed that the flushing system utilized contributed to the successful control of odor because the system is able to operate with minimal interruption that can be typically associated with manual flushing of the system.

What is claimed is:
1. A system for treating wastewater comprising
a source of a treating slurry;
a pump disposed to deliver at least a portion of the treating slurry to the wastewater;
a source of a flushing fluid; and
a controller configured to energize the pump in a treating mode that delivers the at least a portion of the treating slurry to the wastewater and actuates a first valve, located downstream from the source of the treating slurry and upstream of the pump, in an open position; a second valve, located downstream of the pump, in an open position; and a third valve, located downstream from the source of the flushing fluid, in a closed position, when in the treating mode,
the controller further configured to energize the pump in a reverse flushing mode that introduces the flushing fluid to a conduit that connects the source of the treating slurry to the wastewater and actuates the first valve and the third valve in an open position, and to actuate the second valve in a closed position, when in the reverse flushing mode, and further configured to energize the pump in a forward flushing mode that introduces the flushing fluid to the conduit.

2. The system of claim 1, wherein the source of the treating slurry comprises a mixer disposed to agitate the treating slurry.

3. The system of claim 1, wherein the treating slurry comprises an alkaline earth hydroxide.

4. The system of claim 1, wherein the flushing fluid is selected from the group consisting of water and an acid solution.

5. The system of claim 1, wherein the viscosity of the treating slurry is less than about 1000 centipoise.

6. The system of claim 1, wherein the controller is configured to actuate the first valve in a closed position, and to actuate the second valve and the third valve in an open position, when in the forward flushing mode.

7. The system of claim 6, wherein the controller is further configured to adjust a flowrate of at least one of the treating slurry from the source of the treating slurry and the flushing fluid from the source of the flushing fluid.

* * * * *